United States Patent

Horigome et al.

[11] 4,315,057
[45] Feb. 9, 1982

[54] MAGNETIC RECORDING MEDIUM

[75] Inventors: Eiji Horigome; Hitoshi Azegami; Hiroshi Ohta, all of Tokyo, Japan

[73] Assignee: TDK Electronics Co., Ltd., Tokyo, Japan

[21] Appl. No.: 192,697

[22] Filed: Oct. 1, 1980

[30] Foreign Application Priority Data

Oct. 9, 1979 [JP] Japan ................. 54/129424

[51] Int. Cl.³ ..................... H01F 10/02; B05D 5/12
[52] U.S. Cl. ................................. 428/694; 428/900
[58] Field of Search ............................ 427/127–132, 427/48; 252/62.54; 428/900, 694

[56] References Cited

U.S. PATENT DOCUMENTS 3,922,389 11/1975 Toledo et al. ............... 427/128 X
4,074,012 2/1978 Heikskinen et al. ......... 427/128 X Primary Examiner—Bernard D. Pianalto
Attorney, Agent, or Firm—Oblon, Fisher, Spivak, McClelland & Maier

[57] ABSTRACT

A magnetic recording medium comprises a substrate coated with a magnetic layer comprising a magnetic powder and a binder and a rust inhibitor at a ratio of more than 0.1 wt. % based on resins of the binder.

3 Claims, 2 Drawing Figures

MAGNETIC RECORDING MEDIUM

BACKGROUND OF THE INVENTION

1. FIELD OF THE INVENTION

The present invention relates to a magnetic recording medium. More particularly, it relates to a magnetic recording medium which prevents the wearing of the magnetic recording medium or the formation of rust on a magnetic head and which prevents the wearing and rusting of the magnetic head.

2. DESCRIPTION OF THE PRIOR ART

A magnetic recording medium especially a magnetic tape is run in contact with a magnetic head thereby performing the recording and reproducing. It has been required to use a magnetic tape under severer conditions. It has been developed to have mechanical characteristics of the magnetic tape so as to be used under such severer conditions. If the recording and the reproducing under such severer condition are repeated, the magnetic head is worn or rusted whereby it is difficult to maintain the characteristics of the magnetic head.

SUMMARY OF THE INVENTION

It is an object of the present invention is to provide a magnetic recording medium which imparts wearing-preventing effect and rust-preventing effect to a magnetic head used by contacting with the magnetic recording medium.

It is another object of the present invention is to provide a magnetic recording medium which prevents the wearing of the magnetic recording medium caused by rusting a magnetic head.

The foregoing and other objects of the present invention have been attained by providing a magnetic recording medium having a magnetic powder layer comprising a magnetic powder, a binder and a rust inhibitor at a ratio of more than 0.1 wt. % based on the binder.

DETAILED DESCRIPTION OF THE PREFERRED EMBODIMENTS

Figure 1:
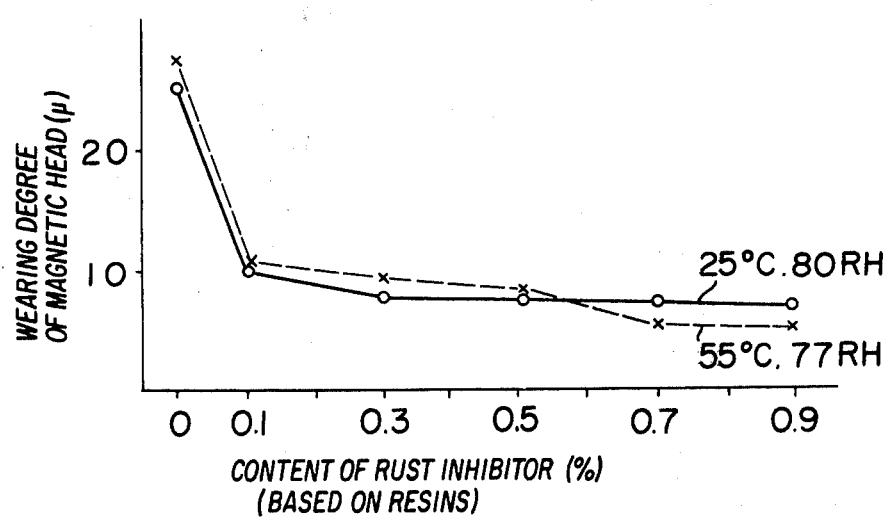
FIG. 1 is a graph showing the relation of wearing degrees of a magnetic head and contents of the rust inhibitor in the magnetic recording medium of the present invention.

The magnetic recording medium is formed by coating a magnetic composition on a substrate made of a metal or a plastic film such as polyethyleneterephthalate film in a form of a sheet or a tape. The magnetic composition is formed by a magnetic powder and a binder. These components and structures are well-known by many disclosures including the inventor's inventions. The detail of these components and structures is not repeated, and only important feature of the present invention will be described.

In accordance with the present invention, a rust inhibitor is incorporated in the magnetic powder layer of the magnetic recording medium thereby preventing the formation of rust on the magnetic head. The rust inhibitor can be incorporated in a preparation of the magnetic powder composition.

Suitable rust inhibitors include organic compounds having a polar group especially nitrogen-containing organic compounds such as organic amines, imides, azoles, thiazoles and esters. These rust inhibitors can be selected from the known rust inhibitors. The rust inhibitor is incorporated into the magnetic powder composition to be effective for preventing the rusting of the magnetic head.

In accordance with the present invention, the wearing of the magnetic recording medium caused by rusting the magnetic head is substantially reduced. The effect of the rust inhibitor is not only the rust inhibiting effect, but also the other effects that the wearing of the magnetic head is remarkably reduced and sensitivity of the magnetic recording medium in the recording and reproducing is remarkably improved and the wearing of the magnetic recording medium caused by the rusting of the magnetic head can be completely prevented.

In accordance with the present invention, the original characteristics of the magnetic head can be maintained for a long period.

The present invention will be further illustrated by certain examples which are provided for purposes of illustration only and are not intended to be limiting the present invention.

| EXAMPLE 1: | |
|---|---|
| Magnetic powder($\alpha$-Fe$_2$O$_3$) | 120 g. |
| Vinyl chloride-vinyl acetate copolymer: | 36 g. |
| Polyurethane prepolymer: | 4 g. |
| Dispersing agent: | 1.2 g. |
| Additive: | 0.4 g. |
| Solvent(mixture of methyl ethyl ketone, methyl isobuytl ketone and toluene): | 300 g. |
| Rust inhibitor(benzotriazole): | more than 0.1 wt. % based on resins |
| EXAMPLE 2: | |
| Magnetic powder ($\alpha$-Fe$_2$O$_3$): | 160 g. |
| Vinyl chloride-vinylidene chloride copolymer: | 38 g. |
| Nitride rubber(NBR): | 54 g. |
| Additive: | 1.5 g. |
| Solvent(methyl ethyl ketone, methyl isobutyl ketone and toluene): | 250 g. |
| inhibitor(benzodiazole): | more than 0.1 wt. % based on resins |

Each mixture of these components was kneaded in a ball mill to prepare each magnetic powder composition. This was coated on a polyethyleneterephthalate film to prepare each magnetic recording tape.

Each magnetic recording tape was run at 25° C. in a humidity of 80% RH for 100 hours, or at 55° C. in a humidity of 77% RH for 100 hours. The wearing degree of the magnetic head (shown by the decrease of the thickness) and the decrease of sensitivity of the magnetic head at 8 Hz after the running were measured. Each new magnetic head was used for each test using each magnetic recording tape having different content of the rust inhibitor.

FIG. 1 shows the wearing degrees of the magnetic heads in various contents of the rust inhibitor.

Figure 2:
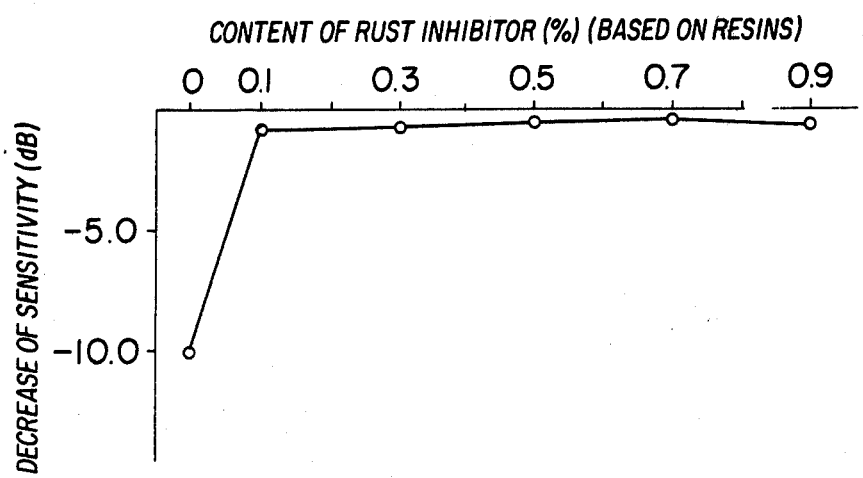
FIG. 2 is a graph showing the relation of decreases of sensitivity of the magnetic head and contents of the rust inhibitor in the magnetic recording medium of the present invention.

FIG. 2 shows the decreases of sensitivity (8 Hz) in various contents of the rust inhibitor.

As shown in FIG. 1, there was not difference between the tests for Example 1 and Example 2. When only about 0.1 wt. % of the rust inhibitor was incorporated, the wearing of the magnetic head was remarkably lowered. When the content of the rust inhibitor was further increased, the wearing of the magnetic head was slightly lowered. The content of the rust inhibitor is preferably more than 0.1 wt. % based on the resins. When the content of the rust inhibitor is about 1 wt. %, the effect is not further improved.

Various magnetic recording tapes were prepared by varying the formulation of Example 1 in ranges of 30 to 32 g. of the vinyl chloride-vinyl acetate copolymer, 4 to 8 g. of the polyurethane prepolymer; 1.2 to 2.4 g. of the dispersing agent; and 0.4 to 1.0 g. of the additive. The same tests were carried out to find the fact that the results are substantially the same as those of Example 1 as shown in FIGS. 1 and 2.

In accordance with the present invention, the characteristics of the magnetic head and the effect for preventing the formation of rust on the magnetic head can be maintained for a long time.

We claim:

1. In a magnetic recording medium which comprises a substrate coated with a magnetic layer comprising a magnetic powder, a resinous binder and a rust inhibitor, the improvement of the rust inhibitor comprising benzotriazole or benzodiazole at a ratio of more than 0.1 wt. % based on resins of the binder.

2. The magnetic recording medium according to claim 1 wherein said rust inhibitor is benzotriazole.

3. The magnetic recording medium according to claim 1 wherein said rust inhibitor is benzodiazole.

* * * * *